(12) United States Patent
Block et al.

(10) Patent No.: US 6,195,795 B1
(45) Date of Patent: Feb. 27, 2001

(54) APPARATUS AND METHOD FOR AUTOMATIC SOFTWARE RELEASE NOTIFICATION

(75) Inventors: John D. Block; David F. Carrier, III, both of Plano; R. John K. Gillespie, Carrollton; Mohsen E. Sadeghi, Dallas, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/994,252

(22) Filed: Dec. 19, 1997

(51) Int. Cl.⁷ ....................................................... G06F 9/445
(52) U.S. Cl. ................................. 717/11; 717/1; 707/203
(58) Field of Search ............................. 707/203, 511, 707/204; 395/703, 712, 707, 710; 717/1, 3, 11

(56) References Cited

U.S. PATENT DOCUMENTS

| | | | |
|---|---|---|---|
| 4,558,413 | * 12/1985 | Schmidt et al. | 707/203 |
| 4,751,635 | 6/1988 | Kret | 707/10 |
| 4,809,170 | 2/1989 | Leblang et al. | 717/3 |
| 4,912,637 | 3/1990 | Sheedy et al. | 707/203 |
| 4,951,192 | 8/1990 | Chase, Jr. et al. | 717/6 |
| 5,155,847 | 10/1992 | Kirouac et al. | 709/221 |
| 5,278,979 | * 1/1994 | Foster et al. | 707/203 |
| 5,291,598 | 3/1994 | Grundy | 713/200 |
| 5,339,435 | * 8/1994 | Lubkin et al. | 395/712 |
| 5,574,898 | 11/1996 | Leblang et al. | 707/1 |
| 5,586,329 | 12/1996 | Knudsen et al. | 717/2 |
| 5,649,200 | 7/1997 | Leblang et al. | 717/3 |
| 5,664,206 | * 9/1997 | Murrow et al. | 704/8 |
| 5,671,398 | 9/1997 | Neubauer | 703/23 |
| 5,675,802 | 10/1997 | Allen et al. | 717/3 |
| 5,903,897 | * 5/1999 | Carrier et al. | 707/203 |
| 5,950,209 | * 9/1999 | Carrier et al. | 707/203 |
| 5,956,732 | * 9/1999 | Tsuchida | 707/203 |
| 5,974,428 | * 10/1999 | Gerard et al. | 707/203 |
| 6,073,206 | * 6/2000 | Piwonka et al. | 711/102 |

OTHER PUBLICATIONS

Render et al, "An object oriented model of software configuration management", ACM, pp 127–139, May 1991.*
Ochuodho et al, "A process oriented version and configuration management model for communications software", ACM pp 109–120, May 1991.*
Appendices A–E, further described in transmittal.
Baalbergen, et al., "On the Design of the Amoeba Configuration Manager", 10894 ACM SIGSOFT Software Engineering Notes, 17 (1989) Nov., No. 7, pp. 15–22.

* cited by examiner

*Primary Examiner*—Paul R. Lintz
*Assistant Examiner*—Anil Khatri
(74) *Attorney, Agent, or Firm*—Baker Botts L.L.P.

(57) ABSTRACT

An automatic software release notification system (10) is disclosed that provides for a build generator (12) adapted to conduct a software build procedure and automatically generate a build status. The system also comprises a notification manager (14) that is adapted to automatically determine notification parameters in response to the build status. A communications device (16) is also provided that is adapted to automatically send a notification in response to the notification parameters.

3 Claims, 5 Drawing Sheets

APPARATUS AND METHOD FOR AUTOMATIC SOFTWARE RELEASE NOTIFICATION

RELATED PATENT APPLICATIONS

This patent application is related to co-pending U.S. patent applications: U.S. patent application Ser. No. 08/724,830, entitled Software Release Control System and Method, filed Oct. 2, 1996, of the same assignee; U.S. patent application Ser. No. 08/769634, entitled Software Release Media Download System and Method, filed Dec. 16, 1996, of the same assignee; U.S. patent application Ser. No. 08/768405, entitled Software Release Document Process Control System and Method, filed Dec. 16, 1996, of the same assignee; U.S. patent application Ser. No. 08/769226, entitled Software Release Metric Reporting System and Method, filed Dec. 16, 1996, of the same assignee; and U.S. patent application Ser. No. 08/769225, entitled Software Testing Process Control System and Method, filed Dec. 16, 1996, of the same assignee. The preceding applications are hereby incorporated by reference.

TECHNICAL FIELD OF THE INVENTION

The present invention relates to the field of computer software, and more particularly, apparatus and method for automatic software release notification.

BACKGROUND OF THE INVENTION

Large-scale software development efforts require proper coordination and management of teams of software engineers and test engineers. When a software development effort involves a large group of engineers simultaneously working on multiple versions and releases of a large number of different source modules of the software product, confusion and inefficiency easily results if the development process and subsequent product release are not properly managed. For example, some engineers may be coding source modules for version 3.1 of a software product X while some engineers may be incorporating newer features into source modules for version 4.0, and still some engineers may be providing a fix to some problems reported in source modules of version 2.1. Note that it is possible to have overlap between the three groups of engineers, so that an engineer may be involved in all three efforts.

Compounding the problem is the fact that each version of a software product must pass through multiple developmental stages prior to its release, where advancing to the next stage requires the passing of some predetermined testing and approval process. To be tested, all the source modules for that version of the software product must be collected and built into a load. The process of load building is also called the compiling and linking of all the source modules. The resultant load or build is a software product to be further tested, or to be released and delivered to a customer when all the developmental stages have been passed.

This process of load building is currently a frequent cause of long periods of delay or lag time to a software product's production and delivery. Beyond the length of the build itself is the response time needed to inform key personnel of the build results in order to evaluate a completed build and proceed to the next stage in software development. Throughout the course of software development, the process of load building may be conducted many times. A significant delay during each load build can result in a considerable postponement of final product release.

It may be seen that because the process of building a software load is repeatedly performed in the development of a software product, considerable savings in time, energy and expense are possible if the process is automated or otherwise optimized.

SUMMARY OF THE INVENTION

Accordingly, there is a need for an apparatus and method for software release notification that further automates and streamlines the software production and build processes.

An automatic software release notification system is provided that comprises a build generator adapted to conduct a software build procedure and automatically generate a build status. The system also comprises a notification manager that is adapted to automatically determine notification parameters in response to the build status. A communications device is also provided that is adapted to automatically send a notification in response to the notification parameters.

The disclosed invention provides several technical advantages. For example, the invention results in the elimination of substantial delay time between software build procedures and subsequent software testing, continued development, or customer release. Additionally, the invention provides for an efficient means of automatically communicating with many personnel through a variety of communications devices. The invention also provides for a means of automatically classifying errors during a software build procedure and implementing notification procedures to best address the errors that occur. Other technical advantages will be readily apparent to one skilled in the art from the following figures, descriptions and claims.

BRIEF DESCRIPTION OF THE DRAWINGS

For a more complete understanding of the present invention and its advantages thereof, reference is now made to the following brief description, taken in conjunction with the accompanying drawings and detailed description, wherein like reference numerals represent like parts, in which.

DETAILED DESCRIPTION OF THE INVENTION

The preferred embodiments of the present invention and its advantages are best understood by referring now in more detail to FIGS. 1 and 2A–H of the drawings, in which like numerals refer to like parts.

Figure 1:
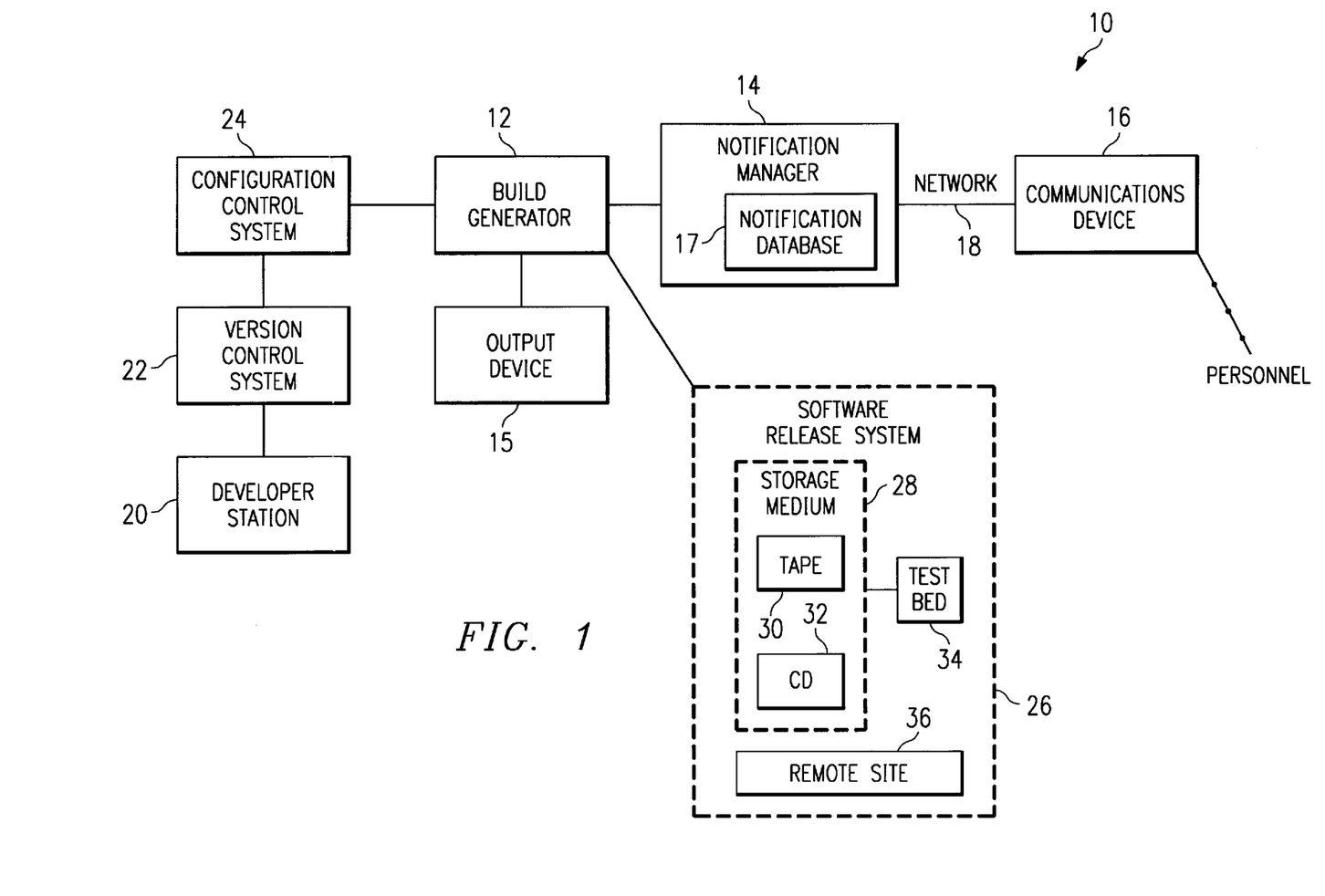
FIG. 1 is a simplified block diagram of an exemplary software release control system constructed according to the teachings of the present invention.

Referring to FIG. 1, a block diagram of a software release notification system 10 constructed according to the teachings of the present invention is shown. Software release notification system 10 comprises a build generator 12 coupled to a notification manager 14 and a communications device 16 via a computer network 18. Notification manager 14 automatically notifies necessary personnel using communications device 16 in response to a status automatically generated by the build generator 12 regarding the results of a software build that compiles and links source modules for a specific version of software release.

Build generator 12 comprises a processor or system that compiles and links source modules developed or modified by software developers for further testing or client release.

Build generator 12 may be coupled to a configuration control system 24 and a software release system 26 via the same network 18 described above. Configuration control system 24 may in turn be coupled to a version control system 22 connected to a developer station 20 via network 18.

Software developed at developer station 20 comprises a specific source module released by an engineer developer to version control system 22 where it is stored along with other source modules being modified or developed for the same build and release as the specific source file. Developer station 20 may comprise a workstation, personal computer, network client, terminal, or any suitable system or device. Third party source files to be incorporated into the build and release may also be stored with the developed source modules. Version control system 22 may comprise one of many available version control systems such as ClearCase by Pure Atria Software of Shaumburg, Ill., Control Version System by Free Software Foundation of Cambridge, Mass., or DSEE by Hewlett Packard of Palo Alto, Calif.

Configuration control system 24 accesses all source files/modules from version control system 22 associated with a specific software library build procedure. An exemplar configuration control system is described in U.S. patent application Ser. No. 08/724,830, entitled Software Release Control System and Method, filed Oct. 2, 1996, of the same assignee. Build generator 12 then compiles and links all accessed source files to create a software release library for a particular software release version. Successful builds of a software release library may be followed by the library being transferred to software release system 26. The load may be downloaded to a portable storage medium 28, such as a tape 30 or compact disc 32. Storage medium 28 containing a load may then be tested on a test bed 34. In addition, the load may be electronically transferred to a remote site 36, via telecommunications networks or computer networks, for operations and/or testing.

Build generator 12 creates a build status for each software library build procedure initiated. The build status may take the form of a log file, for example, displayed on display 15, created on hard copy, or stored in build generator 12 or configuration control system 24. The build status may include messages, codes, or data that indicate errors encountered during the build, the success or failure of the build, and an indication of how far the build has progressed.

Notification manager 14 accesses the build status and determines certain notification parameters to be followed based on the information in the build status. Notification manager then implements notification based on the parameters utilizing communications device 16. Notification manager 14 may comprise a processor or system that executes routines or procedures in response to comparing the build status information to a notification database 17 of communications information that may include the personnel to be notified and specific channels of communication to be utilized. The communication channels may include the selection of one or more mechanisms of communications device 16. Notification database 17 may further break down personnel, channels, and communications device 16 selection based on, for example, the software product, the software release version, a specific software source file or module determined in the status, and the success or failure of the build as determined in the status.

For example, in one embodiment of the present invention, notification database 17 contains a general notification file comprising the names and notification parameters of personnel to be notified upon the completion or termination of any build. Notification manager 14 may also contain a software success file, a hardware success file, a general software error file, a general hardware error file, a specific software error file, and a specific hardware error file within database 17, all containing names and parameters for a list of individuals to be notified given certain circumstances described below.

Communications device 16 initiates signals or procedures in response to the instructions of general notification file 14. Communications device 16 may send data or indicators to other network devices, routines, computers, or personnel such as developers, managers, technicians, engineers, designers or project leaders, for example, based on instructions from notification manager 14. Communications device 16 may comprise one or more of the following communications apparatus: numeric or alpha-numeric paging devices, voice pagers, two way pagers, voice mail, loud speakers, internet paging services or routines, electronic mail, telephone calls, radio devices, telephone or paging escalation routines, monitoring systems, defect tracking systems, electronic bulletin boards, displays, lighted signs, user interfaces, X-Windows pop up messages, or executed UNIX commands. Communications device 16 may repeat the delivery of data or indicators at intervals through the same communications channel or a different one at intervals determined by instructions from notification manager 14 as specified by the notification parameters stored in notification database 17.

Figure 2A:
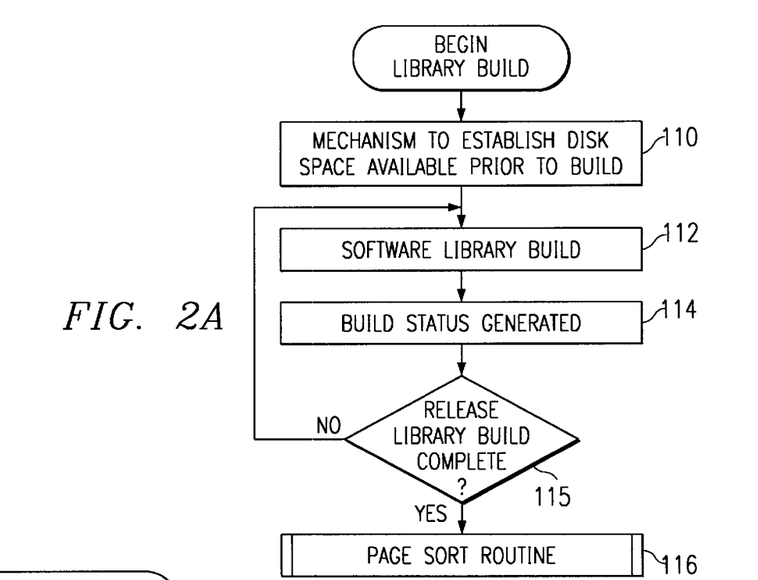
FIGS. 2A–G are exemplary flowcharts of the software release notification process according to the teachings of the present invention.

FIGS. 2A through 2G comprise a flowchart describing a software release notification process according to the teachings of the present invention. Referring to FIG. 2A, a flowchart representing a procedure initiating and terminating a software library build process is shown. Prior to a software library build process, build generator 12 from FIG. 1 establishes the available disk space needed for a specific build file in step 110 prior to the 30 software build.

Next, the software library build process implemented by build generator 12 is conducted in step 112. During software library build process software source modules for a specific release version are compiled and linked. A s build is conducted, build generator 12 also produces data regarding the continuing status of the build in step 114. The build status may contain information including, but not limited to, the build version number, the software product name, a list of source modules successfully compiled or linked, the elapsed time since build initiation, any errors encountered, the location or source of encountered errors, information based on the category of error encountered, whether an error was hardware or software related, and a successful build notification. The build status may consist of human readable text and/or computer interpreted binary code. The build status may be output to the display 15, other computer, file, or printed out as hard copy. Status is continually generated by build generator until the build process is completed or terminates as determined in step 115. Upon build completion or termination, page sort routine is then initiated as shown in step 116 by notification manager 14.

Figure 2B:
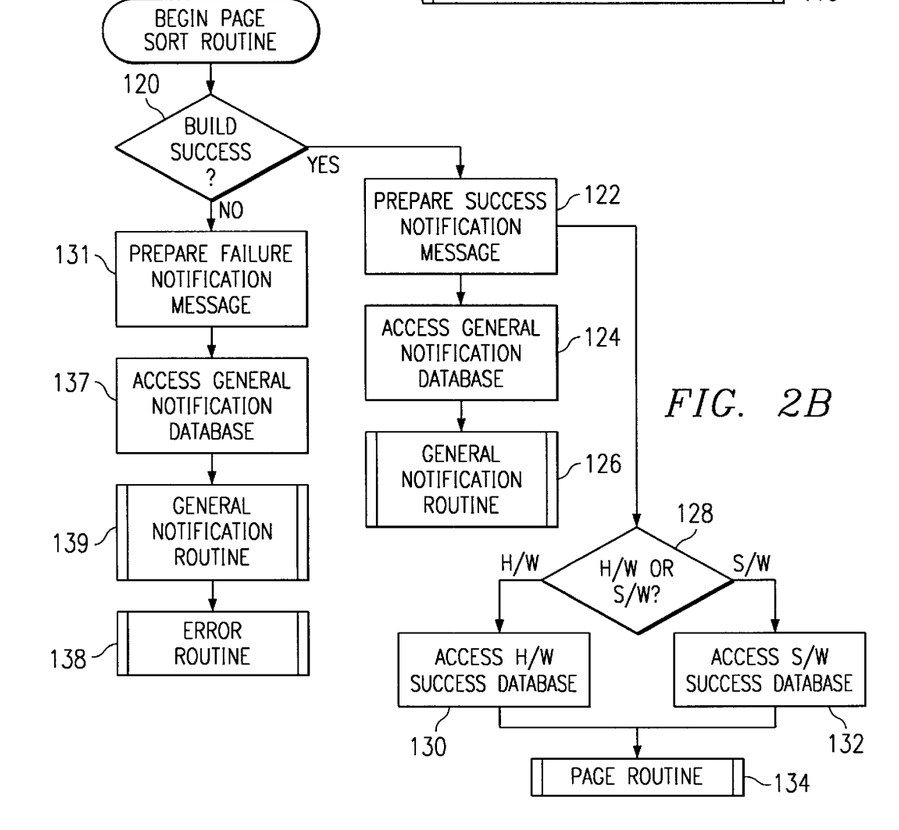

Page sort routine is shown in detail by the flowchart in FIG. 2B. If the build is successful, as determined by examining the status in step 120, the sort routine prepares a success notification message in step 122 for delivery.

Page sort routine then accesses a general notification file in step 124 that may identify the general personnel to be notified upon the completion or termination of any software build conducted at a specific build facility. General personnel may comprise build system operators, engineers, managers, or third party employees. General personnel may also include other employees or individuals that indicate a desire to be informed upon any successful build completion. Page sort routine retrieves notification parameters from the general notification file that may include, for example, work schedules, available modes of communication, and a paging protocol for each determined member of personnel. The page sort routine then initiates general notification routine in step 126 to communicate the success notification message prepared in step 122. General notification routine of step 126 is described in detail by FIG. 2C and discussed below.

After preparing success notification message, page sort routine of FIG. 2B also determines in step 128 if the additions and/or modifications tested by the software build process comprise a hardware or software configuration change.

If the configuration change was hardware related, the page sort routine will access a hardware success file in step 130 containing notification parameters for determined hardware engineers that are to be notified upon successful build completion. The page sort routine then initiates a page routine in step 134 to communicate the success notification message prepared in step 122.

If the configuration change was software related, the page sort routine will access a software success file in step 132 containing notification parameters for determined software engineers that are to be notified upon successful build completion. The page sort routine then initiates the page routine in step 134 to communicate the failure notification message prepared in step 122.

If in step 120 the software build process was not a success or terminated prematurely, the page sort routine will prepare a failure notification message in step 136. The page sort routine then accesses the general notification file in step 137 and retrieves notification parameters. The page sort routine initiates a general notification routine in step 139 to communicate the failure notification message prepared in step 136. The page sort routine will also access an error routine in step 138 to initiate notification procedures based on specific data regarding build errors identified in the build status. The error routine is shown in detail in FIG. 2D.

Figures 2C, 2D:
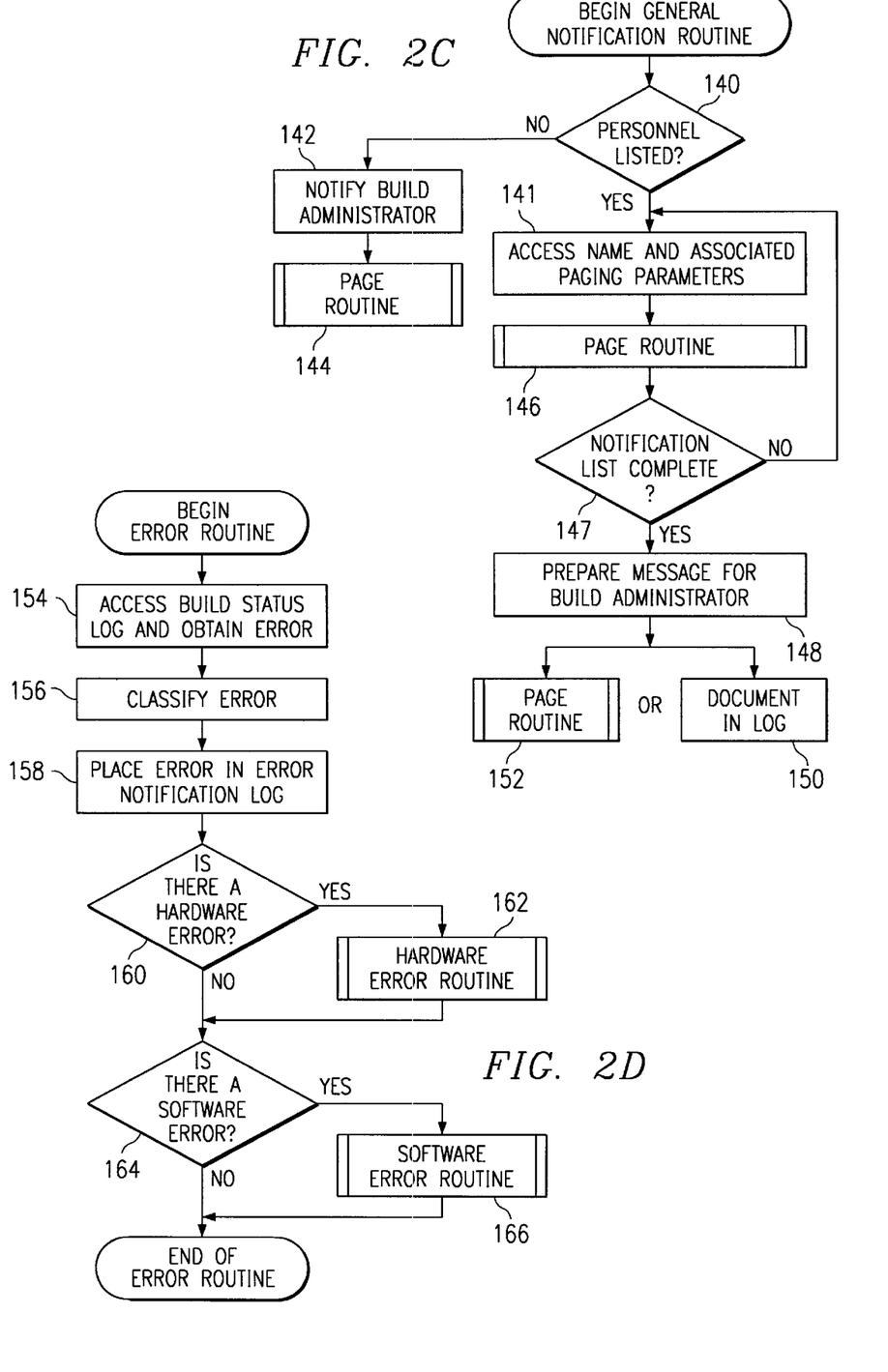

The general notification routine of steps 126 and 139 is shown in more detail in FIG. 2C. The general personnel and associated notification parameters obtained in step 124 (FIG. 2B) from the general notification file are used by the general notification routine to initiate notification by notification manager 14 via communications device 16. In step 140 a determination is made as to whether any personnel are listed in the general notification database. If so, the first listed member of personnel and the associated notification parameters for that member are obtained from the database. If there are no personnel listed in the general personnel database, a predetermined build administrator is notified in step 142 by accessing the page routine in step 144. The member of personnel obtained in step 141 is notified using his or her notification parameters by accessing the page routine in step 146.

After the completion of the page routine, the general notification routine polls the general personnel list to see if everyone on the list has been notified in step 147. If the list is not completed, the next individual on the list is accessed along with associated notification parameters in step 141 and paged using the page routine of step 146. The general notification routine continues until all of the general personnel are notified as determined in step 147. Upon completion of notification, the general notification routine prepares a message in step 148 determining the completion of general notification for the build administrator in charge of the particular software build process. The message of completion can be documented in a log in step 150 and/or sent directly to the build administrator in step 152 via the page routine.

FIG. 2D describes the error routine of step 138 (FIG. 2B). As mentioned above, an error routine is called upon the failure of any specific software build. The error routine first accesses the build status log and obtains the first error listed in the build status log in step 154. Error routine then classifies the error in step 156 by performing a search routine of the error line or lines and comparing, for example, characters, words, or other identifiable ASCII formats that are generated in the build status log and that are normally associated with software errors or hardware errors. If the build file comprises binary data, binary formats representing errors can be similarly searched and compared. Once an error has been identified and classified, the exact error message and its classification will be duplicated and placed in an error notification log in step 158.

Figure 2E:
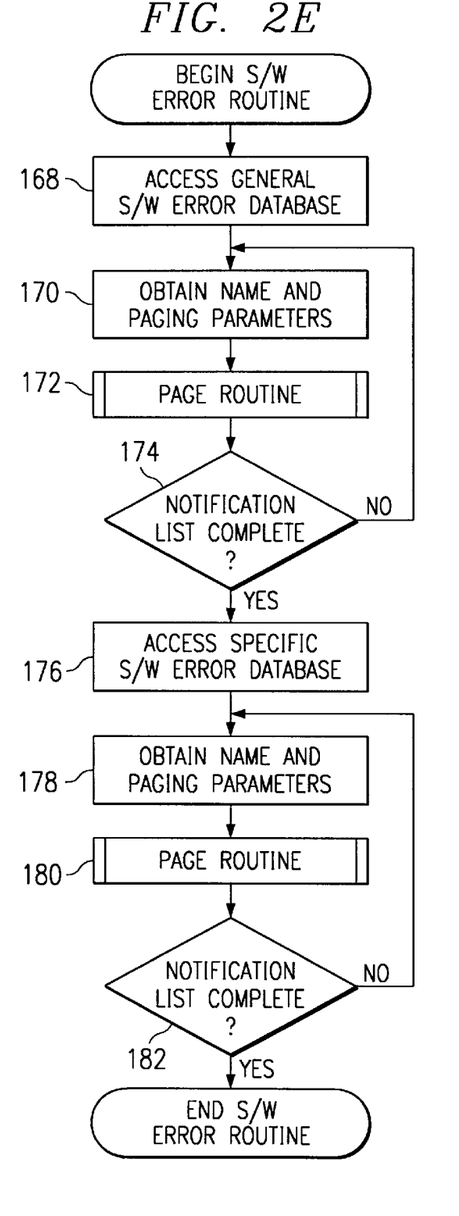
Figure 2F:
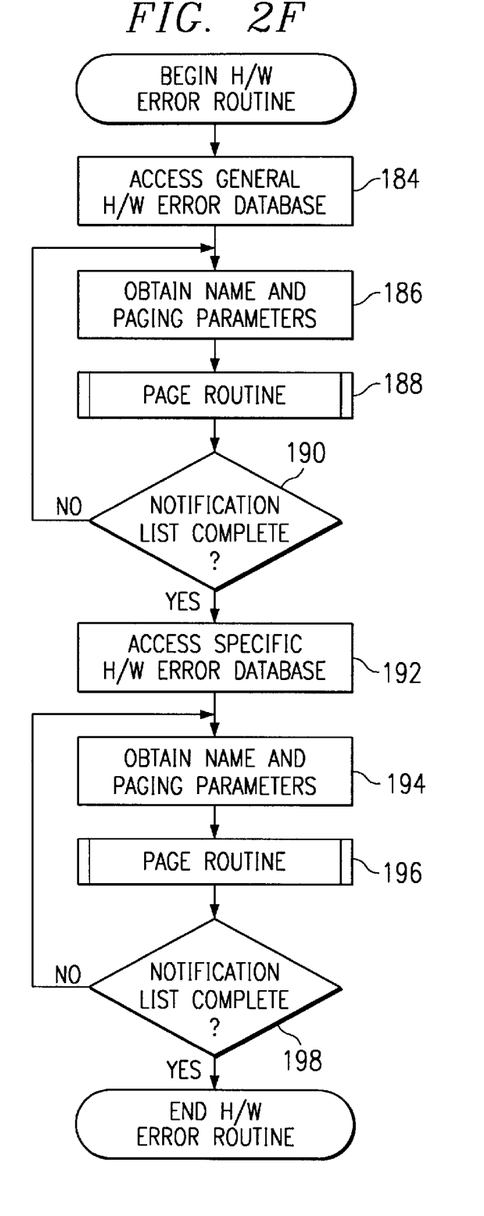

The error routine next determines if the error is hardware related in step 160. If the error is hardware related, for example, a lack of memory, a system resource being down, or other system failure, a hardware error routine further described by FIG. 2E is initiated in step 162. If however, the error routine indicates the problem is software related in step 164, a software error routine further described by FIG. 2F is initiated in step 166.

Although FIG. 2D describes a process flow whereby only one error is accessed from the build status log, it will be understood that the process may easily be modified to classify and report any number of errors found in the build status log. In such a process, the routine designed to identify characters in or messages associated with specific software and hardware errors may search the entire build status log in an iterative manner until all characters and lines of the build status log have been searched. Additionally, it should be noted that it is possible for the error routine to indicate an error that involves both software and hardware problems. In the case of both a software and a hardware error being determined, error routine will initiate both software error and hardware error routine as shown in FIG. 2D.

FIG. 2E describes a software error routine. The software error routine first accesses a general software error file in step 168. General software error file contains the names and notification parameters of personnel to be notified in the event of software errors on any build conducted. Software error routine obtains the first name and associated notification parameters from general software error file in step 170. The routine then executes the page routine in step 172 to notify the named member of personnel as to the presence of an error and the specific text and classification of the error as found in the error notification log of step 158. The routine next determines, in step 174, whether all listed personnel have been notified. If more personnel are listed the software routine obtains the next name in step 170 and again institutes the paging routine in step 172.

Upon the notification of all personnel listed in the general software error file, software error routine next accesses a specific software error file in step 176 that is associated with that specific software build and contains the names and notification parameters, for example, of design, programming, and testing engineers for software modules modified or effected by that build. As with the general software error file, software error routine obtains the first name and associated notification parameters from specific software error file in step 178. The routine then executes the page routine in step 180 to notify the named member of personnel as to the presence of an error and the specific text and classification of the error as found in the error notification log of step 158. The routine next whether all listed personnel have been notified in step 182. If more personnel are listed the software routine obtains the next name in step 178 and again institutes the paging routine in step 180. If notification of all listed personnel is completed, control returns to the error routine.

FIG. 2F describes a hardware error routine. The hardware error routine first accesses a general hardware error file in step 184. General hardware error file contains the names and notification parameters of personnel to be notified in the event of hardware errors on any build conducted. Hardware error routine obtains the first name and associated notification parameters from general hardware error file in step 186. The routine then executes the page routine in step 188 to notify the named member of personnel as to the presence of an error and the specific text and classification of the error as found in the error notification log of step 158. The routine next determines, in step 190, whether all listed personnel have been notified. If more personnel are listed the hardware routine obtains the next name in step 186 and again institutes the paging routine in step 188.

Upon the notification of all personnel listed in the general hardware error file, hardware error routine next accesses a specific hardware error file in step 192 that is associated with that specific hardware build and contains the names and notification parameters, for example, of engineers designing and integrating hardware effected by that build. As with the general hardware error file, hardware error routine obtains the first name and associated notification parameters from specific hardware error file in step 194. The routine then executes the page routine in step 196 to notify the named member of personnel as to the presence of an error and the specific text and classification of the error as found in the error notification log of step 158. The routine next determines, in step 198, whether all listed personnel have been notified. If more personnel are listed the hardware routine obtains the next name in step 194 and again institutes the page routine in step 196. After notification of all listed personnel is completed, control returns to the error routine.

Figure 2G:
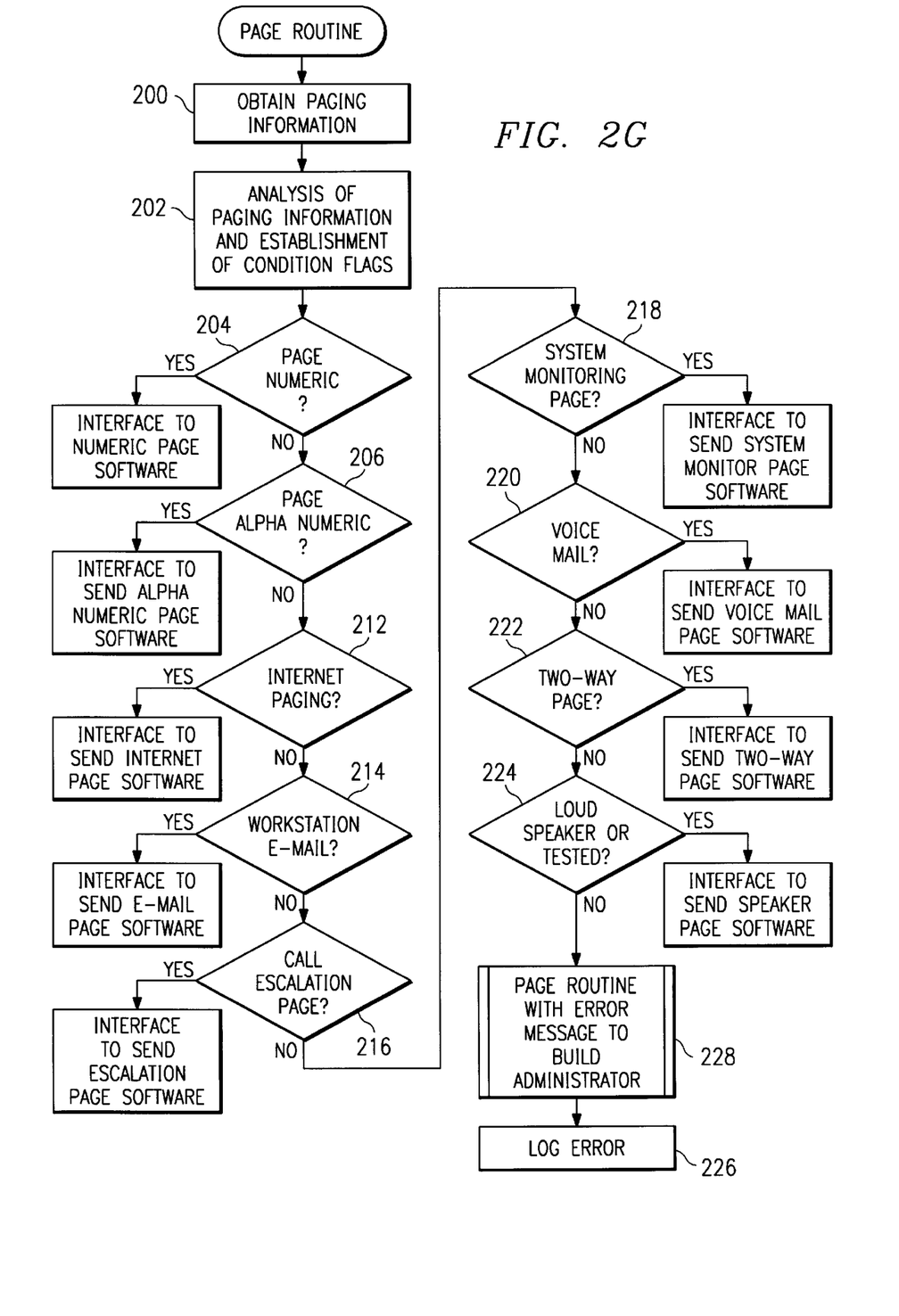

The page routine called by the above routines is shown in FIG. 2G. Page routine is given the name and notification parameters for an individual and institutes procedures to notify that individual. Notification parameters may specify, for example, available means of communicating with individual, specific contact information for each means such as a phone number, and may be further broken down by available means at certain hours or on certain days. For example, notification parameters may indicate an individual is to be contacted via work station electronic mail and voice mail during business hours, and via pager and call escalation after business hours or on weekends.

Page routine first obtains paging information that may include the name of an individual to be paged, associated notification parameters, and a notification message from the routine call that page routine receives in step 200. In step 202, page routine analyzes the notification parameters and sets condition flags for each communications channel communications device 16 is capable of accessing based on information contained within the parameters and other programmed conditions such as the time of day or day of the week.

In step 204, page routine begins initiating communication to the individual by first querying if a numeric page flag was enabled in step 202. If a numeric page flag is set, page routine will send a numeric page utilizing an interface to numeric paging software and using the contact information provided by the notification parameters. Notification parameters for a numeric page may include, for example, leaving a telephone number on the pager that has a prerecorded or computer generated status or error message. Computer generated status or error message may be created by the page routine using the text of the notification message received from the routine call.

In step 206, page routine queries if an alpha-numeric page flag was enabled in step 202. If an alpha-numeric page flag is set, page routine will send a alpha-numeric page in using the contact information provided by the notification parameters and an alpha-numeric interface to alpha-numeric software. Notification parameters will again be consulted for contact information, for example. Notification message or a portion thereof may be directed to be left on the alpha-numeric pager.

The page routine continues querying flags to see if various means of communication are specified in the notification parameters. In this manner, page routine queries to see if internet paging is desired in step 212, workstation electronic mail in step 214, a call escalation page in step 216, a system monitoring page in step 218, voice mail in step 220, two way paging in step 222, or loud speaker announcement in step 224. If for some reason notification parameters for an individual are corrupted, an error noting the failed notification may be logged to file in or screen in step 226 and the build administrator himself may be paged regarding the failed communication in step 228.

It should be understood that the system and methodology described above is not restricted to a paging system or software configuration management, but may be also utilized in other systems and/or processes involving integrated testing, scheduled processing, and projects requiring notification of personnel based on programmable criteria which may or may not easily allow all personnel to be contacted through the same means. The page accessing system described above is particularly important in software development because of the interactive nature of such processes which requires frequent and immediate interaction upon development engineers and personnel and between a developer and a client system or network.

Although the present invention has been described with several embodiments, various changes and modifications may be suggested to one skilled in the art. It is intended that the present invention encompass such changes and modifications as fall within the scope of the present appended claims.

What is claimed is:

1. An automatic software release notification system, comprising:
   a build generator adapted to conduct a software build procedure and automatically generate a build status;
   a notification manager adapted to automatically determine notification parameters in response to the build status, the notification manager operable to determine whether the software build procedure is related to a hardware or software configuration change; and
   a communications device adapted to automatically send a notification in response to the notification parameters and the type of configuration change;
   wherein the notification manager comprises a specific database listing personnel associated with a specific build;

wherein the specific database comprises a list of personnel to be contacted in response to specific information contained in the build status.

2. A method of software release notification, comprising the steps of:

conducting a software build process;

generating a build status as a result of that software build process;

determining whether the software build process relates to a hardware or software configuration change;

comparing the build status to a database of predetermined conditions;

consulting a notification file based on the comparison to the predetermined conditions;

determining members of personnel to contact based on the notification file and the type of configuration change and the type of configuration change;

determining available communication channels adapted to contact the determined members of personnel; and contacting the determined members of personnel using the determined available communication channels, wherein the step of determining available communication channels further comprises accessing the notification file and receiving notification parameters from the notification file.

3. A method of software release notification, comprising the steps of:

conducting a software build process;

generating a build status as a result of that software build process;

placing the build status in a status log;

determining whether the software build process relates to a hardware aor software configuration change;

comparing a line of the status log to a database of known build status lines;

classifying the line of the status log base on the known build status lines;

consulting a notification file based on the classification of the line of the status log;

determining members of personnel to contact based on the notification file and the type of configuration change;

determining available communication channels adapted to contact the determined members of personnel based on the notification file;

determining information to be transmitted along each determined available communication channel based on the notification file;

contacting the determined members of personnel using the determined available communication channels; and sending the determined information over available the communication channels, wherein the step of determining available communication channels further comprises accessing the notification file and receiving notification parameters from the notification file.

* * * * *